Oct. 29, 1968     V. A. LA MAGNA     3,407,970

DISPENSER WITH A METERING DEVICE HAVING A CHAMBER SCRAPER

Filed Feb. 23, 1967     2 Sheets-Sheet 1

INVENTOR
VITO A. LA MAGNA
BY
ATTORNEY

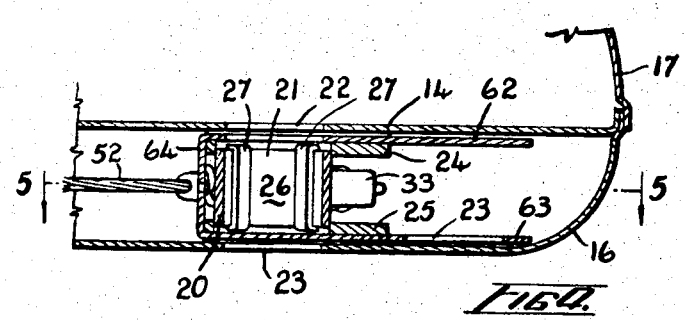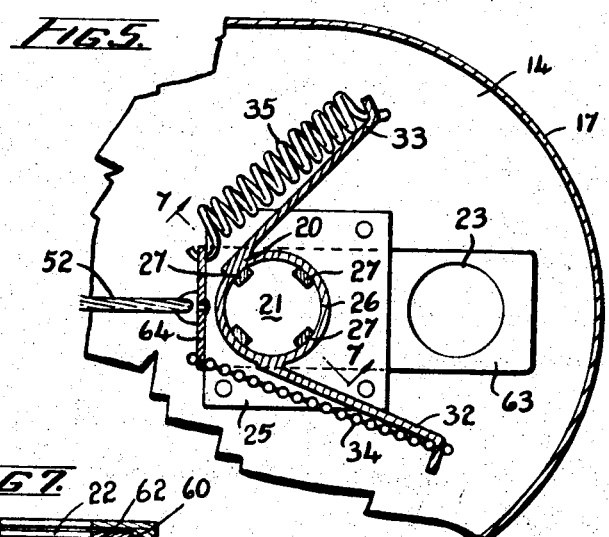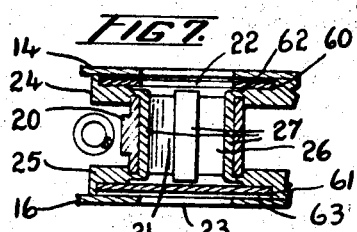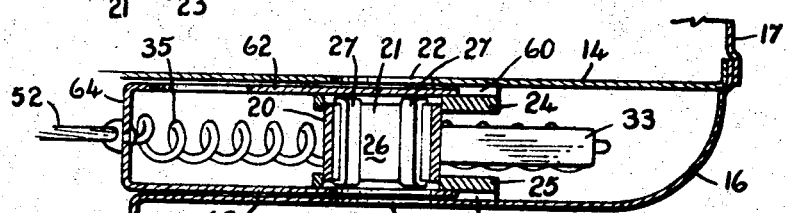

United States Patent Office 3,407,970
Patented Oct. 29, 1968

3,407,970
DISPENSER WITH A METERING DEVICE HAVING A CHAMBER SCRAPER
Vito A. La Magna, 207 Pearson Ave., Toronto 3, Ontario, Canada
Filed Feb. 23, 1967, Ser. No. 617,963
7 Claims. (Cl. 222—148)

ABSTRACT OF THE DISCLOSURE

A metering device for use with a dispensing container of granulated material having a metering chamber formed within a tubular body portion which is axially rotated when the material is discharged from the metering device. A number of rigid means are disposed within the metering chamber and engage the inner walls of the metering chamber. When the material is discharged from the metering device the rigid means scrape the walls as the body portion is rotated to remove any encrusted material thereon.

This invention relates to dispensing devices and more particularly to a dispenser with a rotatable metering device for metering pre-measured quantities from a container to which the metering device is attached.

Many situations arise in which it is desired to dispense free-flowing granulated or ground material in pre-measured quantities from a container in which the material is held. Yet, when some of the material becomes encrusted on the side walls of a metering chamber in the metering device, it is awkward to remove the encrusted material as so often the chamber in the metering device is located or positioned where it is difficult to clean out without dismantling the dispenser.

The present invention is directed to a dispensing device with a metering device of novel structure for dispensing material therefrom and means for removing encrusted materials from the side walls of the chamber of the metering device. In accordance with the invention, a metering device is provided for dispensing granular or ground material from a container comprising: a tubular body portion with a metering chamber; means for securing said body portion to said container; means for selectively admitting said material into said chamber in a normal position; means for selectively discharging said material from said chamber in a discharging position; means for axially rotating said body portion; co-operating means engaging the inner surface of said chamber for scraping said surface when said body portion is rotated; said admitting means, said discharging means, and said rotating means being so interconnected that when the material is being dispensed from the chamber said body portion is axially rotated; and means adapted to return said admitting, discharging, and rotating means to the normal position.

In the preferred embodiment of the invention, the metering device comprises: a vertically positioned tubular body portion with a metering chamber therein; a first and second guide means horizontally positioned at the upper and lower regions of said body portion, openings in said first and second guide means aligned with the top and bottom of the metering chamber respectively; co-operating means engaging the inner surface of the metering chamber and affixed at the upper and lower regions of the co-operating means to the first and second guide means respectively, said co-operating means being vertically disposed in the chamber and positioned a set distance apart around the horizontal axis of the metering chamber, said body portion being engaged at the top and bottom thereof by said co-operating means for supporting the body portion in its vertical position while allowing the body portion to axially rotate; means to axially rotate the body portion; said first and second guide means being secured to the container, and said co-operating means scraping the inner surface of the chamber when the body portion is rotated. The co-operating means while removing any encrusted material on the inner surface of the metering chamber will not interfere with the flow of the material either into the chamber from the container or out of the chamber on discharging.

It is, therefore, an object of the present invention to provide a rotatable metering device for dispensing measured quantities of material from a container with a means for removing any encrusted material off the inner surface of a metering chamber in the metering device.

A further object is to provide a dispenser having an axially rotated metering device with a metering chamber where the inlet and outlet openings are selectively opened and closed to permit the flow of material into and out of the metering chamber. While the metering device is axially rotated a plurality of stationary co-operating means scraping the inner surface of the metering chamber to remove any encrusted material on the surface so that the pre-measured amount of material in the chamber will be dispensed therefrom.

In the drawings which illustrate embodiments of the invention:

FIGURE 4 is an elevation view in section taken along the line 4—4 of the FIGURE 2 showing the invention associated with the metering chamber when the metering device is in the normal position;

FIGURE 5 is a top view in section taken along the line 5—5 of the FIGURE 4 showing the metering device in the normal position;

FIGURE 6 is an elevation view in section taken along the line 4—4 of the FIGURE 2 showing the metering device in the discharging position;

FIGURE 7 is an elevation view in section taken along the line 7—7 of the FIGURE 5 showing the body portion of the metering device supported by the co-operating means with the metering device in the normal position.

It should be noted that with respect to the drawings if any openings are aligned with each other or to be aligned with each other, i.e. the opening 23 in the second slide member 63 which will be aligned with the opening 23 in the metering chamber 21 in the discharging position, the openings will be given only one number, shown in FIGURE 6.

Figure 1:
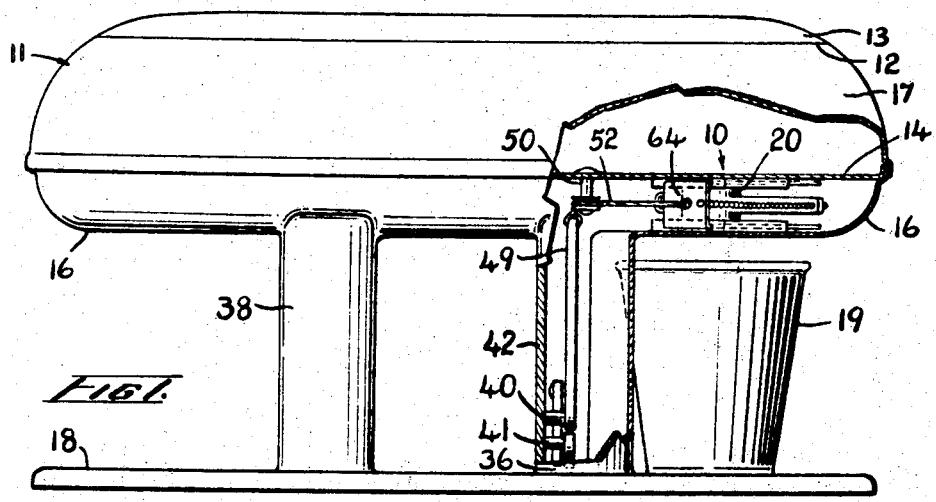
FIGURE 1 is an elevation view, partly in section, that shows the metering device attached to the container.

With reference to the drawings, FIGURE 1 shows a completely assembled metering device 10 attached to a container 11 which is shown partly in section to show the metering device 10. As illustrated, the metering device 10 is supported between and secured to a base 14 and a bottom piece 16 of the container 11. Openings 22 and 23 in the base 14 and bottom piece 16 respectively are aligned with the inlet and outlet openings 22 and 23 of the metering device 10, shown better in FIGURE 4, so that the granulated material in the container 11 will be admitted into the metering device 10 and then discharged therefrom into a cup 19 placed below the opening 23.

The container 11 includes side walls 17 in an elongated housing with an opening 12 in the upper side adapted to receive a lid 13. The material to be dispensed is placed in the container 11 through the opening 12 and the material falls through the opening 22 in the base 14 into the metering chamber 21 of the metering device 10. This is the normal position of the metering device 10. Supporting the container 11 at its desired height above a base plate 18 are housings 36 and 38. It may be desirable to have more than one metering device 10 associated with the container 11 and a set up as shown in FIGURE 2 may be used.

Figure 2:
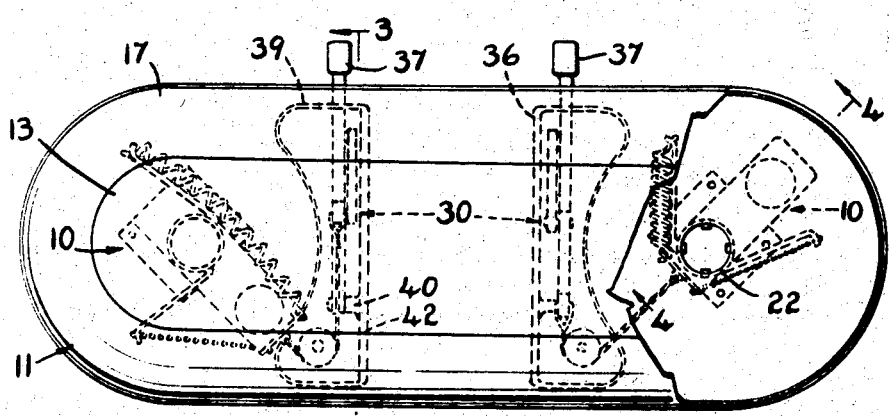
FIGURE 2 is a top view, partly in section, that shows two metering devices attached to the container.
Figure 3:
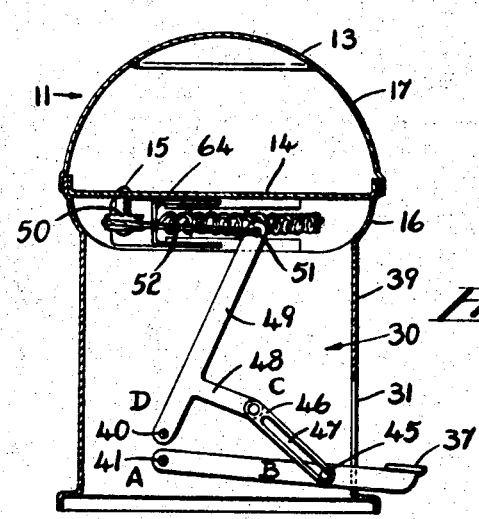
FIGURE 3 is an end view in section taken along the line 3—3 of FIGURE 2 shownning the linkage means between an actuating means and the metering device.

Through an actuating means 30 as shown in FIGURES 2 and 3, the vertical motion of an actuating arm 37 is transferred to a lateral movement of a connecting means 64 associated with the metering device 10 causing slide members 62 and 63, shown better in FIGURES 4 and 6, to move from the normal position to the discharge position. Also the lateral movement of the connecting means 64 is used to axially rotate the body portion 20 of the metering device 10 at the same time.

The actuating means 30, shown best in FIGURE 3, are positioned within the housings 36 and 38 but only one need be described as each functions the same way. The actuating means 30 comprises an actuating arm 37 which extends out a slot 31 of one end 39 of the housing 38, the arm 37 is pivotally mounted on a pin 41 which extends perpendicularly from a wall 42 of the housing 38 at point A, a bar 46 with a slot 47 is associated with the arm 37 at point B by a connecting means 45 which fits in the slot 47, a T-shaped bar 48 is connected to the bar 46 at the point C, the bar 48 is pivotally mounted on a pin 40 which extends perpendicularly from the wall 42 at point D, the vertical arm 49 of the bar 48 has an opening 51 in the upper regions thereof and extends vertically to just below the center line of a pulley 50. The pulley 50 is supported from the base 14 by a shaft 15. A line 52 is connected to the bar 48 at the opening 51 and the line 52 runs around the pulley 50 to the connecting means 64.

When the actuating arm 37 is moved downwardly in its vertical plane, the bar 48 moves to the left about the point D and the line 52 pulls the connecting means 64 towards the pulley 50. Thus the slide members 62 and 63 move from the normal to the discharge position. A tensioned spring 35 returns the slide members 62 and 63, and the actuating means 30 to the normal position when the downward pressure is removed from the arm 37.

The invention, as shown more clearly in FIGURES 4 to 7, associated with the metering device 10 includes a tubular body portion 20 forming a metering chamber 21 with an opening 22 in the top for admitting material into the chamber 21 and an opening 23 in the bottom for discharging material therefrom. The body portion 20 is supported between first and second guide means 24 and 25 respectively which are interconnected by four vertical co-operating means 27 that are disposed within the metering chamber 21. The co-operating means 27 are positioned around the horizontal axis of the body portion 20 so as to engage the inner surface 26 of the chamber 21.

Guide means 24 and 25 have vertical openings 22 and 23 respectively aligned with the openings 22 and 23 of the metering chamber 21 and horizontally cut receiving passageways 60 and 61 respectively for guiding slide members 62 and 63 therein. Guide means 24 and 25 are connected to the base 14 and the bottom piece 16 of the container 11 respectively and thus the slide members 62 and 63 move only in a horizontal direction. The slide members 62 and 63 have openings 22 and 23 respectively which are not aligned but spaced apart so that material from the container 11 will be admitted into the metering chamber 21 in the normal position and then in the discharge position the opening 22 will be shut off from the container 11 and only the material in the chamber 21 will be discharged. The slide members 62 and 63 are connected at the same end of each by a vertical connecting means 64 which when laterally moved by the actuating means 30 provides for simultaneous sliding of the slide members 62 and 63 from the normal to the discharge position.

A pair of horizontal arms 32 and 33 project from the outer surface of the body portion 20 and are disposed at an angle to each other. Arm 32 is connected to the connecting means 64 by a chain 34 so that when the connecting means 64 is moved laterally the body portion 20 will be axially rotated. A spring 35 is connected between the arm 33 and the connecting means 64 to provide a bias means to return the slide members 62 and 63 and the body portion 20 back to their normal position when the downward pressure on the actuating arm 37 is released.

Thus, in operation, when the metering device 10 is used to discharge a pre-measured amount of material from the metering chamber 21 the body portion 20 will be axially rotated so that the co-operating means 27 will scrape the inner surface of the chamber 21 to remove any material encrusted thereon.

It will be understood, of course, that modifications can be made in the preferred embodiments of the invention described herein without departing from the scope of the invention defined by the appended claims.

What I claim as new and desire to protect by Letters Patent of the United States is:

1. A metering device for dispensing granular or ground material from a container comprising: a tubular body portion having a metering chamber, means for securing said body portion to said container, means for selectively admitting the material into said chamber from the container in a normal position, means for selectively discharging the material from said chamber in a discharge position, means for axially rotating said body portion, means for scraping the walls of said chamber when said body portion is rotated, said admitting and dispensing means and rotating means so interconnected that when the material is being discharged from said chamber the body portion is axially rotated, and means adapted to return said discharging and admitting means and rotating means into the normal position.

2. A metering device as in claim 1 wherein said scraping means comprises a stationary co-operating means, vertically disposed within said metering chamber, engaging the inner surface of the metering chamber.

3. A metering device as in claim 1 wherein said scraping means comprises a plurality of co-operating rigid means, vertically disposed within said chamber, engaging the inner surface of the metering chamber, said rigid means being axially positioned equidistantly apart from each other in the metering chamber.

4. A metering device as in claim 2 wherein said securing means comprises: a first and second guide means located at the top and bottom of said body portions respectively and being perpendicularly disposed thereof, said scraping means being affixed to said first and second guide means and vertically disposed within the metering chamber engaging the inner surface thereof, and engaging the top and bottom of the body portion in its vertical position to support the body portion therein.

5. A metering device as in claim 1, and said scraping means being so disposed with respect to the walls of said chamber that the relative movement of the body portion and the scraping means will effect the removal of any material encrusted thereon.

6. A metering device as in claim 1, and means for moving the body portion so that said scraping means will engage the walls of said chamber and remove any material encrusted thereon.

7. A metering device for dispensing pre-measured amounts of granular or ground material from a container having a base with an opening therein comprising: a tubular body portion having a metering chamber, support means for securing said body portion to said container and supporting it in a vertical position, said support means including a first and second guide means, a plurality of co-operating rigid means affixed to said first and second guide means adapted to be positioned within the metering compartment engaging the inner surface thereof for scraping the inner surface when the body portion is axially rotated, means connecting said first and second guide means to said container so that the chamber is under said opening, means for axially rotating the body portion within said support means, means for selectively admitting the material into the chamber in a normal position, means for selectively discharging the material from the chamber in a discharge position, said admitting means, discharging means, and rotating means so interconnected that when said material is discharging from the chamber the body portion is axially rotated, and means adapted to return said discharging and admitting means and rotating means into the normal position.

References Cited

UNITED STATES PATENTS

| | | | |
|---|---|---|---|
| 1,430,935 | 10/1922 | Bright | 222—235 X |
| 3,269,611 | 8/1966 | Komarek | 222—342 X |

STANLEY H. TOLLBERG, *Primary Examiner.*